Figure 1:
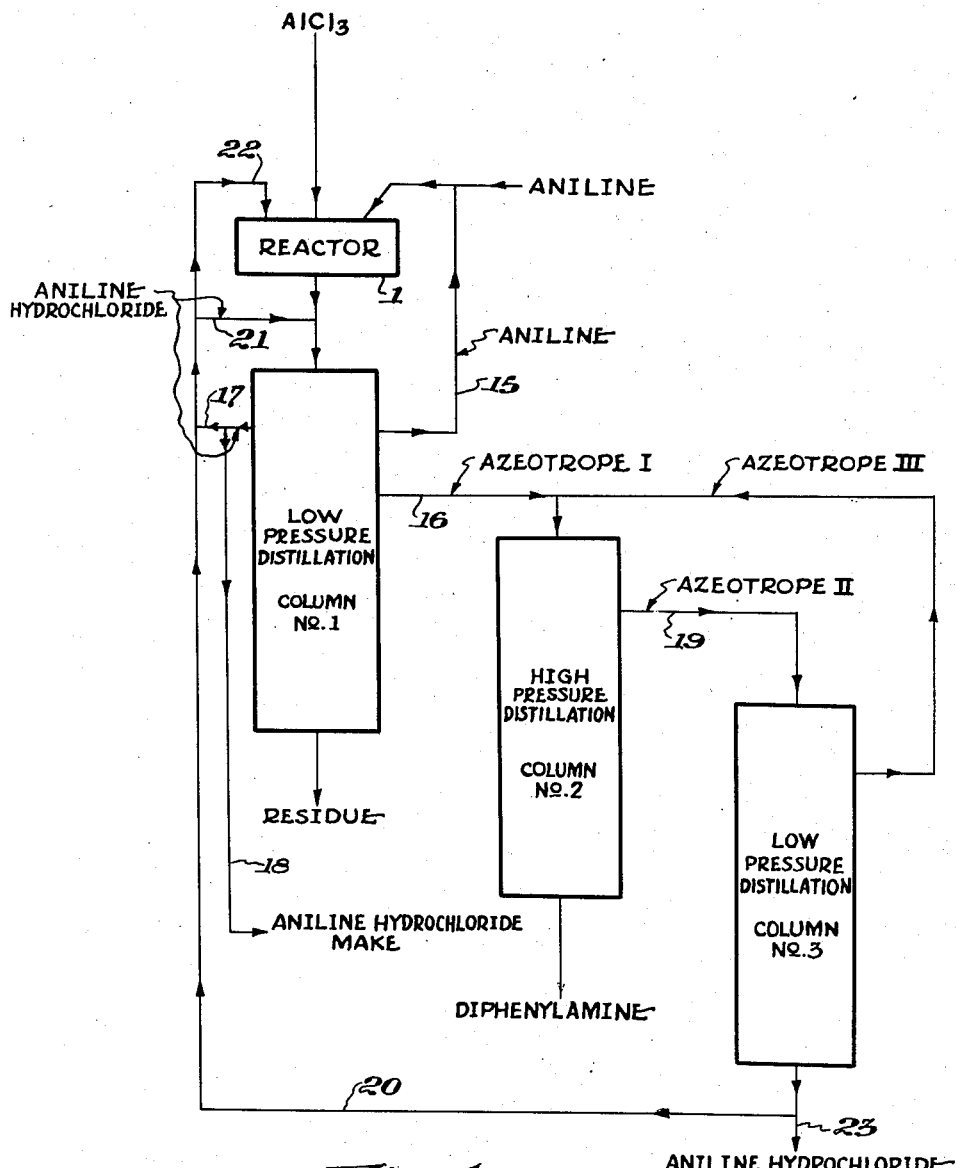

Oct. 20, 1953  G. T. JOHANNESEN  2,656,389
PRODUCTION OF DIPHENYLAMINE
Filed Nov. 9, 1948  2 Sheets-Sheet 1

INVENTOR.

Patented Oct. 20, 1953

2,656,389

UNITED STATES PATENT OFFICE 2,656,389

PRODUCTION OF DIPHENYLAMINE

George T. Johannesen, Mount Lebanon, Pa., assignor to Koppers Company, Inc., a corporation of Delaware Application November 9, 1948, Serial No. 59,083

13 Claims. (Cl. 260—576)

The invention relates to the manufacture of diphenylamine and is particularly directed to processes for recovering diphenylamine from reaction mixtures obtained by bringing together aniline, aniline hydrochloride and aluminum chloride under deammoniating conditions.

This application is in part a continuation of my copending application, Serial Number 759,281, filed July 5, 1947, now abandoned.

It is known that diphenylamine can be produced effectively by bringing together aniline, aniline hydrochloride and a suitable metallic halide under conditions adapted to deammoniate the aniline. Ferrous chloride and zinc chloride have been found particularly effective. Aluminum chloride has also been suggested for this purpose. The latter, however, while in many respects superior to either ferrous chloride or zinc chloride has not been utilized commercially due probably to the difficulty of recovering aniline and diphenylamine from the reaction mixture.

The present invention has for its objects to provide new and improved processes for the manufacture of diphenylamine by deammoniation of aniline in the presence of aniline hydrochloride-aluminum chloride catalyst; to provide improved processes for recovering diphenylamine from the reaction product of such deammoniation processes; to provide processes for effectively separating aniline and diphenylamine in the presence of aniline hydrochloride-aluminum chloride catalyst; to provide processes for recovering aniline hydrochloride in such processes; to prevent cyclic build-up of aniline hydrochloride; to provide effective ways for separating mixtures of diphenylamine and aniline hydrochloride; to provide effective ways for distilling mixtures of diphenylamine and aniline hydrochloride in the presence of aluminum chloride to minimize or avoid decomposition of diphenylamine in such distillations; to avoid the disadvantages of the prior art and to obtain advantages as will become apparent. Further objects will appear as the description proceeds.

These objects are broadly accomplished in the present invention by bringing together aniline, aniline hydrochloride and aluminum chloride under deammoniating conditions to produce a reaction mixture containing aniline, aniline hydrochloride, aluminum chloride and diphenylamine, distilling from the reaction mixture a fraction boiling substantially as an azeotrope of diphenylamine and aniline hydrochloride in the presence of an amount of aniline hydrochloride at least azeotropically equivalent to the diphenylamine in said reaction mixture whereby all of the diphenylamine in the reaction mixture is distilled over in said fraction, subjecting said fraction to distillation at a different pressure and recovering thereby another fraction boiling substantially as an azeotrope of aniline hydrochloride and diphenylamine, subjecting said last named fraction to distillation at a pressure different from said second named distillation and having the same sign (plus or minus) relative thereto as the first named distillation and recovering thereby a fraction boiling substantially as an azeotrope of diphenylamine and aniline hydrochloride, and recovering in said distillations a fraction boiling substantially as diphenylamine and a fraction boiling substantially as aniline hydrochloride, said distillations being carried out at a pressure such that the maximum overhead temperature in any distillation is less than about 270° C.

It will be understood that the terms "high pressure" and "low pressure" as used herein are not used in an absolute sense, but only as relative to one another. The only limitations on pressure are those determined by the physical limitations of the products which are distilled. On the high side the pressure should be adjusted so that the maximum temperature which obtains in the distillation is below the decomposition temperature of diphenylamine. Ordinarily it will not be desirable to have a temperature in excess of about 270° C., particularly in the presence of aluminum chloride and the pressure may be regulated accordingly, depending upon what fractions are taken overhead. Ordinarily it will be sufficient to measure only the overhead temperature. Thus, were diphenylamine taken overhead in the first distillation, the pressure should not exceed much over 350 mm. mercury because at this pressure the boiling point of diphenylamine is 265° C. When, however, the highest boiling fraction taken overhead is the diphenylamine-aniline hydrochloride azeotrope, a substantially higher pressure may be used. It has been determined, for example, that this azeotrope boils at about 233° C. at 740 mm. mercury pressure and it has been estimated that the pressure may be increased as high as about 2500 mm. mercury pressure before the boiling point reaches 270° C. A precise figure is not believed material since those skilled in the art will readily be able to operate the process by adjusting the pressure to keep the overhead temperature below about 270° C. On the low side there is no lower limit other than that determined by the economics of pulling a high vacuum unless it is the high melting point of aniline hydrochloride, but ordinarily it will not be necessary or desirable to go below about 100 mm. mercury pressure.

In accordance with a preferred aspect of the invention, I prefer to operate the deammoniation at a pressure above atmospheric sufficient to maintain the temperature between 275° C. and about 350° C., as set forth more particularly in the Webb and Nimmo Patent No. 2,514,530. Desirably, this temperature is maintained by maintaining a gentle reflux of aniline over the liquid reaction mixture. The ammonia liberated in the deammoniation, for example, may be released from the reactor as required to keep a gentle reflux of aniline over the reaction mixture. A suitable pressure vessel provided with a suitable reflux condenser will be required. At the same time it is desired to maintain the aniline hydrochloride to aluminum chloride in the proportions of at least 3 mols of aniline hydrochloride per mol of aluminum chloride. A mol ratio of 3 to 1 is suitable. Apparently 1 mol of aluminum chloride combines with 3 mols of aniline hydrochloride to form the active catalytic complex and any excess of aluminum chloride over this is not only inactive in producing the desired reaction, but tends to bring about the formation of tar and other undesirable by-products. When the reaction is carried out under these conditions it is possible to maintain a ratio of aniline to aniline hydrochloride as high as 13 to 1 or more as compared to 1 to 1 ratio of the prior art. It will be seen therefore that the reaction mixture will contain diphenylamine far in excess of the azeotropic composition so that on the first distillation the bulk of the product diphenylamine will be recovered as such. This is shown by the following material balance (parts herein are by weight unless otherwise specified) which is in accordance with the procedure of the Webb and Nimmo patent supra.

9,310 parts of aniline consisting of 5,320 parts of makeup aniline and 3,990 parts of recycled aniline are introduced into a suitable reactor along with 333 parts of aluminum chloride, 971 parts of aniline hydrochloride and 1,440 parts of diphenylamine. The latter two are comprised in the recycled aniline hydrochloride-diphenylamine azeotrope. The reaction mixture thus obtained is heated for five hours under a gentle reflux of aniline while maintaining a temperature at 300° C. by periodic release of ammonia. Over the reaction period about 425 parts of ammonia are recovered. The reaction mixture is now subjected to fractional distillation at 350 mm. mercury pressure, the first fraction boiling essentially at 155–155.5° C. consists essentially of aniline. 3,990 parts of aniline are thus recovered and recycled in the process. The intermediate fraction boils essentially at 215° C. It consists essentially of a constant boiling mixture of aniline hydrochloride and diphenylamine in the proportions of about 50.0% of aniline hydrochloride and 49.1% diphenylamine. 2,126 parts of the intermediate fraction are taken overhead and subjected to a second distillation at a pressure of about 250 mm. mercury. About 111 parts of aniline hydrochloride are recovered in the bottoms fraction and the overhead containing 971 parts of aniline hydrochloride and 1,044 parts of diphenylamine are recycled to the deammoniation. In the first distillation a third overhead fraction, boiling essentially at 265°, consists essentially of diphenylamine. 3,751 parts of diphenylamine are thus taken overhead. There remain in the still 1,364 parts residue.

Under preferred conditions for the deammoniation, the liquid reaction mixture is maintained under a pressure above atmospheric sufficient to maintain the temperature between about 275° C. and about 350° C. with a catalyst ratio of at least 3 mols of aniline hydrochloride for each mol of aluminum chloride, and with the reagents in the proportion of from about 5 to 15 parts of aniline to each part of aniline hydrochloride.

Processes which require distillation of diphenylamine away from the aluminum chloride residue are disadvantageous. Under these circumstances, even at pressures less than about 350 mm. mercury, substantial decomposition of the diphenylamine results. This decomposition, for example, may range from about 5 to 6% at 100 mm. mercury pressure to about 15% at 350 mm. mercury pressure. A further disadvantage in this process is that there is considerable aniline loss in the distillation in the presence of aluminum chloride residue. This may range from 1 to 2% at 100 mm. to 7% or so at 350 mm. These processes also require that the second distillation be conducted at a pressure lower than the first, although the reverse would be advantageous because in the absence of aluminum chloride residue higher temperatures may obtain without excessive decomposition of diphenylamine.

I have now found that these disadvantages may be avoided by carrying out the first distillation in the presence of sufficient aniline hydrochloride to distill over all of the diphenylamine as an azeotrope with the aniline hydrochloride. Under these circumstances the maximum temperature involved in the distillation of diphenylamine in the first distillation is the boiling point of the azeotrope. This substantially reduces decomposition of the diphenylamine, so much so in fact that with sufficiently low pressure, say around 100 mm. mercury pressure, the decomposition of diphenylamine is very low.

In carrying out processes of this type the necessary aniline hydrochloride to complete distillation of diphenylamine as an azeotrope may be added to, may be formed in situ in, may be present in the reaction mixture from the deammoniation or otherwise incorporated in the reaction mixture. While processes such as disclosed in Bezzubets et al., Org. Chem. Ind. (USSR) 4 No. 13, 28–30 (1937) (C. A. 31, 8521 (1937)), inherently give a reaction mixture containing the requisite aniline hydrochloride, it is more desirable to carry out the deammoniation according to the preferred procedure outlined above and to introduce the needed aniline hydrochloride directly into the first distillation because the amount of aluminum chloride per unit of diphenylamine is much lower.

It is desirable to have present in the first distillation an excess of aniline hydrochloride over that required to distill over all the diphenylamine. This insures that the diphenylamine is distilled away from a mixture of the aluminum chloride residue and aniline hydrochloride. Advantageously this excess may be in order of about 3 mols aniline hydrochloride for each mol of aluminum chloride, because this is the proportion in which aluminum chloride and aniline hydrochloride combine to form the complex which appears to be the active catalyst in the deammoniation. It is not absolutely necessary, however, to employ this excess of aniline hydrochloride because the aluminum chloride is already so bound up in the aluminum chloride residue that it does not distill over, notwithstanding its low vapor pressure.

Figure 2:
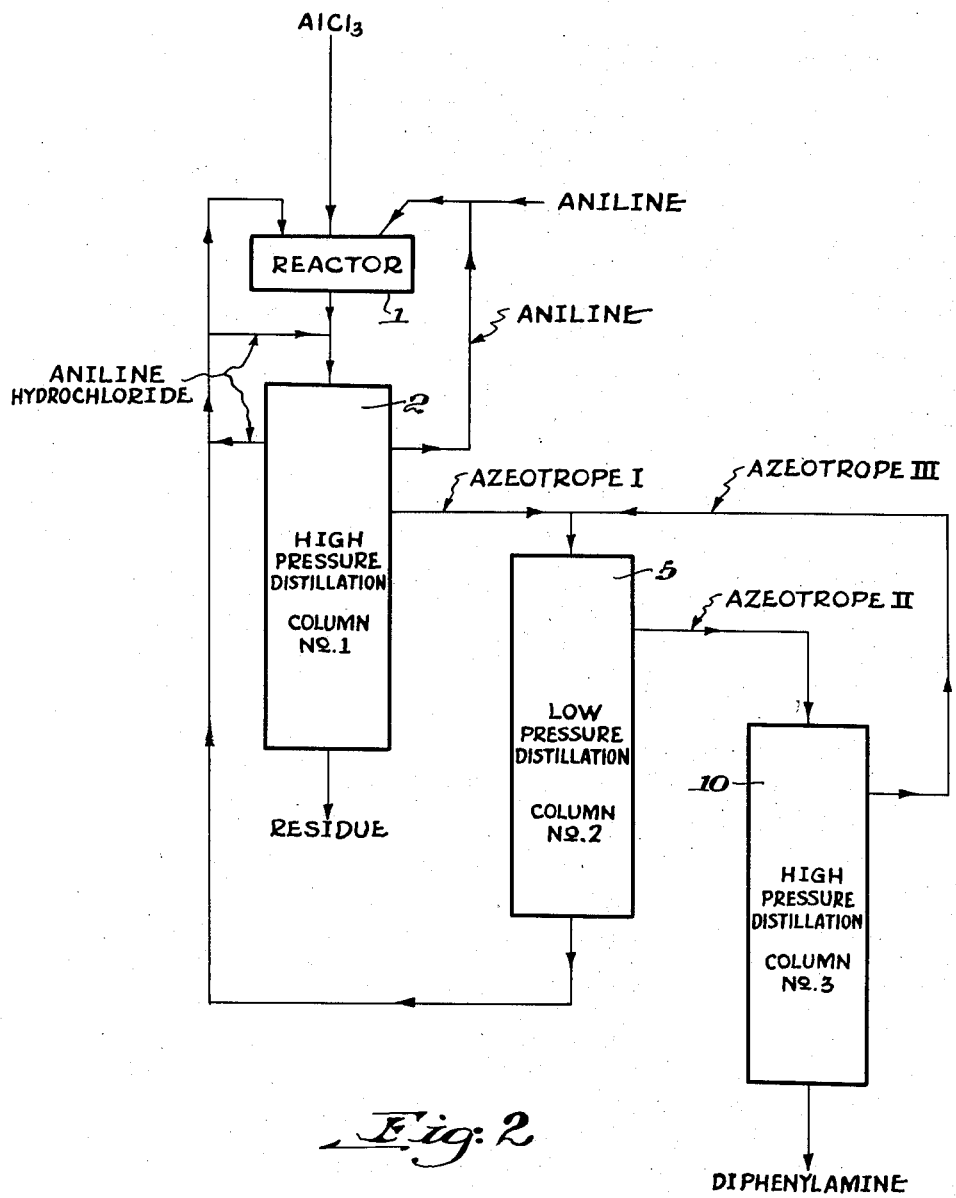

The invention can be more fully understood by reference to the accompanying drawings in which Figures 1 and 2 are flow sheets illustrating different embodiments of the invention. It is to be understood that the representations of the several figures are purely diagrammatic and that one or more fractionating columns can be used in each distillation represented or that several distillations can be carried out batchwise in any suitable distillation apparatus.

A typical procedure according to a modification of the invention is illustrated in Figure 1. Aniline, aniline hydrochloride and aluminum chloride are charged into the reactor 1 and the deammoniation is brought about in the same manner as described in the Webb and Nimmo patent supra. The reaction mixture is withdrawn from reactor 1 and admixed with aniline hydrochloride in the amount required, that is to say, in at least the amount which, taken together with the aniline hydrochloride already present in the reaction mixture, is the azeotropic equivalent of the diphenylamine therein. The admixture thus obtained is fed to the low pressure distillation, column No. 1. In this distillation aniline is taken overhead as the first fraction and recycled through line 15 to the reactor 1. The aniline hydrochloride-diphenylamine azeotrope is taken overhead as the second fraction and passed on through line 16 to the high pressure distillation, column No. 2. Any excess aniline hydrochloride or any aniline hydrochloride made in the distillation is then taken overhead and recycled through line 17 or discharged to product through line 18. The azeotrope of this distillation, azeotrope I, in admixture with the azeotrope of the third distillation, azeotrope III, is fed to the high pressure distillation, column No. 2. In this distillation an azeotrope, azeotrope II, is taken overhead and diphenylamine is recovered in the bottoms fraction, in column 2. Azeotrope II is fed through line 19 to the low pressure distillation, column No. 3, where azeotrope III is taken overhead and aniline hydrochloride is recovered in the bottoms fraction. The recovered aniline hydrochloride is recycled through line 20 to the process. It is divided between lines 21 and 22 according to the particular requirements of the deammoniation and the first distillation. If desired, the aniline hydrochloride made in the process may be withdrawn through line 23 instead of through line 18. By operating in this manner the distillation losses in the first distillation may be substantially cut down, and if the pressure is low enough the aniline loss and the diphenylamine loss in this distillation are negligible. It has the further advantage that the second distillation may be carried out at atmospheric pressure or greater because diphenylamine is not distilled away from aluminum chloride and because the highest temperature required in this distillation is determined by the boiling point of the azeotrope rather than the boiling point of diphenylamine. It is possible, for example, to effect atmospheric pressure distillation here without the overhead temperature going above about 233° C., the boiling point of the azeotrope at this pressure (740 mm.). The pressure may be run up even as high as about 2500 mm. mercury pressure without the temperature becoming so high as to cause excessive decomposition of diphenylamine. The process has the further advantage, particularly where the first distillation is conducted at a low enough pressure that decomposition of diphenylamine is negligible, that the second low pressure distillation may be combined with the first. In fact, separate first and third distillations are desirable only where excessive decomposition of diphenylamine would result through the recycle of azeotrope II to the first distillation. Hence, if the pressure in the first distillation is low enough to keep decomposition of diphenylamine to a negligible figure, azeotrope II may be advantageously recycled to the first distillation. If this is not done, and the second low pressure distillation is carried out as a separate step, it need not, of course, be at the same pressure as the first distillation. Since aluminum chloride is not present in this distillation, it is not necessary to go to such low pressures in order to avoid decomposition of diphenylamine. The pressure differential between the second and third distillation then is important only as the greater the differential the less will be the circulating load of diphenylamine through recycling of azeotrope III.

A typical material balance according to the procedure of Figure 1 is illustrated as follows: 9,310 parts of aniline consisting of 5,190 parts of make-up aniline and 422 parts of recycled aniline are introduced into a suitable reactor along with 333 parts of aluminum chloride and 971 parts of recycled aniline hydrochloride. The reaction mixture thus obtained is heated for five hours under a general reflux of aniline while maintaining a temperature at 300° C. by periodic release of ammonia. Over the reaction period, about 425 parts of ammonium are recovered. The reaction mixture is now mixed with 3,575 parts of recycled aniline hydrochloride and the mixture thus obtained subjected to fractional distillation 100 mm. mercury pressure. In this distillation 4,220 parts of aniline are taken overhead as a first fraction and recycled to the deammoniation. 4,230 parts of diphenylamine and 3,575 parts of aniline hydrochloride are taken overhead as the first azeotrope, 971 parts aniline hydrochloride are taken overhead as the next fraction, and 776 parts of residue are left. The azeotropic fraction of this distillation, azeotrope I, is now subjected to distillation substantially at atmospheric pressure (740 mm. mercury pressure) along with recycled azeotrope III. In this distillation there are taken overhead 6,670 parts aniline hydrochloride and 3,595 parts diphenylamine, and there are left as still bottoms 4,230 parts of diphenylamine which are recovered as product. The overhead fraction of this distillation, azeotrope II, is now subjected to distillation at 100 mm. mercury pressure. 3,595 parts diphenylamine are taken overhead along with 3,095 parts aniline hydrochloride as azeotrope III and recycled to the high pressure distillation. 3,575 parts of aniline hydrochloride remaining as the bottoms fraction in this distillation are recycled to the first distillation.

It is noted that this procedure deviates from those of the Webb and Nimmo patent in having a low pressure distillation followed by a high pressure distillation and concluding with a low pressure distillation. While it is of particular advantage to use this cycle, particularly because the use of low pressure in the first distillation cuts down diphenylamine decomposition losses, it is not necessary to utilize this cycle. Thus, it is possible to effect some of the advantages of this system by conducting the first distillation at a relatively high pressure, the second distillation at a relatively low pressure, and the third distillation again at a relatively high pressure. It is possible to do this effectively because higher pressures can be utilized in the first distillation as compared with the processes of the Webb and Nimmo patent supra without excessive decomposition of diphenylamine. Thus, for example, where sufficient aniline hydrochloride is added to the reaction mixture so that all the diphenylamine can be distilled over as an azeotrope, the decomposition loss of diphenylamine is less than 10% even at atmospheric pressure, whereas when aniline hydrochloride is not added, and diphenylamine is distilled over in the first distillation as such, decomposition loss at atmospheric pressure is over 30% and at 350 mm. mercury pressure is around 15%. It is thus possible to use a procedure as outlined in Figure 2 in which a low pressure distillation is interposed between two high pressure distillations. It would be suitable, for example, according to this procedure to carry out the first distillation at 740 mm. mercury pressure, the second distillation at 350 mm. mercury pressure, and the third distillation at 740 mm. mercury pressure or higher.

While I have described my invention with reference to particular embodiments thereof, it will be understood that it is not limited to the particular features thereof except as set forth in the appended claims, but may be variously embodied within the spirit and scope of the invention.

I claim:

1. In a cyclic process for the manufacture of diphenylamine by the deammoniation of aniline the steps of bringing together aniline, recycled aniline hydrochloride and aluminum chloride and effecting deammoniation of said aniline by the action of the aniline hydrochloride-aluminum chloride catalyst which is formed when said recycled aniline hydrochloride and said aluminum chloride are brought together, subjecting the reaction mixture containing aniline, aniline hydrochloride, aluminum chloride and diphenylamine to distillation at a pressure such that the maximum overhead temperature is less than about 270° C. and recovering thereby an aniline fraction and an aniline hydrochloride-diphenylamine azeotrope fraction, the amount of aniline hydrochloride present in said reaction mixture during distillation being the azeotropic equivalent of the diphenylamine therein whereby all of the diphenylamine in said reaction mixture is distilled over in said aniline hydrochloride-diphenylamine azeotrope fraction.

2. The method of claim 1 which comprises changing the pressure over said aniline hydrochloride-diphenylamine fraction and subjecting it at the changed pressure to a further distillation and recovering thereby a differently constituted aniline hydrochloride-diphenylamine azeotrope fraction, changing the pressure over said differently constituted aniline hydrochloride-diphenylamine azeotrope fraction in the opposite direction to the first change in pressure and subjecting it to a further distillation at the changed pressure and recovering thereby an aniline hydrochloride-diphenylamine azeotrope fraction, recovering diphenylamine as a fraction of one of said further distillations and recovering aniline hydrochloride as a fraction of the other of said further distillations.

3. The method of claim 1 in which in the distillation there is a substantial excess of aniline hydrochloride over the azeotropic equivalent of the diphenylamine whereby all the diphenylamine is distilled in the aniline hydrochloride-diphenylamine azeotrope away from a mixture of aniline hydrochloride and aluminum chloride residue.

4. The method of claim 3 in which the excess aniline hydrochloride amounts to about 3 mols aniline hydrochloride for each mol of aluminum chloride.

5. The method of claim 2 in which the first distillation is carried out at a low pressure relative to the second distillation.

6. The method of claim 5 in which the first distillation is carried out at a pressure of about 100 mm. mercury.

7. The method of claim 6 in which the third distillation is effected by recycling azeotrope fraction of the second distillation directly to the first distillation of a further deammoniation.

8. In a process for the manufacture of diphenylamine by the deammoniation of aniline comprising the steps of deammoniating aniline by the action of an aniline hydrochloride-aluminum chloride catalyst to form diphenylamine, subjecting the reaction mixture to distillation and recovering thereby an aniline fraction and an aniline hydrochloride-diphenylamine fraction, separately recovering diphenylamine and aniline hydrochloride from at least that part of said aniline hydrochloride-diphenylamine fraction equivalent to the aniline hydrochloride made in the process, recycling the aniline fraction and enough aniline hydrochloride for further deammoniation of aniline in the presence of an aniline hydrochloride-aluminum chloride catalyst and recovering diphenylamine as product, said distillation being carried out under conditions of pressure such that the maximum overhead temperature is less than 270° C. whereby decomposition of diphenylamine by the catalyst residue is substantially avoided and the amount of diphenylamine in said reaction mixture being in excess of the azeotropic equivalent, the improvement which comprises effecting said distillation in a plurality of stages at different pressures and adding aniline hydrochloride to the reaction mixture, the amount of said added aniline hydrochloride being at least the azeotropic equivalent of said excess diphenylamine whereby all of the diphenylamine in the reaction mixture is distilled away from the catalyst in the aniline hydrochloride-diphenylamine azeotrope.

9. The method of claim 8 in which in the first stage of the distillation there is present a substantial excess of aniline hydrochloride over the azeotropic equivalent of the diphenylamine whereby the diphenylamine is distilled away from a mixture of aniline hydrochloride and aluminum chloride residue.

10. The method of claim 9 in which the excess aniline hydrochloride amounts to about 3 mols aniline hydrochloride for each mol of aluminum chloride.

11. The method of claim 8 in which the first stage of the distillation is carried out at a low pressure relative to the second stage of the distillation.

12. The method of claim 11 in which the first stage of the distillation is carried out at a pressure of about 100 mm. mercury.

13. The method of claim 12 in which the third stage of the distillation is effected by recycling azeotrope fraction of the second distillation directly to the first stage of the distillation of a further deammoniation.

GEORGE T. JOHANNESEN.

References Cited in the file of this patent

UNITED STATES PATENTS

| Number | Name | Date |
|---|---|---|
| 1,308,356 | Houlehan | July 1, 1917 |
| 1,314,538 | Rogers | Sept. 2, 1919 |
| 1,392,942 | Houlehan | Oct. 11, 1921 |
| 1,840,576 | Frei | Jan. 12, 1932 |
| 2,514,430 | Webb et al. | July 11, 1950 |

OTHER REFERENCES

Gerschon et al., "J. Applied Chem." (USSR), vol. 9, No. 3, pp. 502–504 (1935).

Gerschon et al., "Org. Chem. Ind." (USSR), vol. 4, No. 22, pp. 553–555 (1937).

Bezubetts, "Org. Chem. Ind." (USSR), vol. 4, pp. 28–30 (1937).

Morton, "Laboratory Technique in Organic Chemistry" (McGraw-Hill Co., Inc., New York, 1938), pp. 69–70.